Nov. 3, 1936.     H. B. LINDSAY     2,059,801

INSULATING STRUCTURE AND METHOD OF MANUFACTURING SAME

Filed Nov. 24, 1934

Inventor:
Harvey B Lindsay,
By Dyrenforth, Lee, Chritton & Wiles,
Attys.

Patented Nov. 3, 1936

2,059,801

UNITED STATES PATENT OFFICE 2,059,801

INSULATING STRUCTURE AND METHOD OF MANUFACTURING SAME

Harvey B. Lindsay, Evanston, Ill.

Application November 24, 1934, Serial No. 754,687

7 Claims. (Cl. 154—28)

One of my objects is to provide a monolithic heat and sound insulating material of relatively great strength, light weight and rigidity together with high heat insulation value, capable of withstanding high constant ambient temperatures, as for example as high as 700° F. to 800° F., and localized temperatures such as are required in line or spot welding, without any appreciable damage, the material preferably to be wholly impermeable to liquids.

Another object is to provide an insulating structure, such as a container, the walls of which will be monolithic, and one component of the monolith of rigid insulating material, the resultant structure being of relatively light weight and presenting relatively great structural strength and rigidity, together with high heat insulation value as above set forth.

In its broadest aspect my invention contemplates the production of a monolithic insulating structural material capable of being manufactured in the form or shape ultimately desired for any of many uses. This material comprises relatively thin sheet material impermeable to liquids, such for example as sheet metals, which forms the outer face or faces of the monolithic material, and firmly bonded thereto (as differentiated from adhered) a relatively thick body of rigid cellular material having high insulation value, and being capable of withstanding the temperatures mentioned, and of sufficient rigidity and structural strength to prevent the relatively thin sheet material to which it is bonded from buckling with resultant crushing of the insulating material at that point, under the stresses and strains to which the structure may be subjected in use.

This monolithic material may be formed in flat panels, in tubular or semi-tubular shape, in the form of barrels or in any desired molded shape.

For the purpose of this invention it is imperative that the component parts referred to, be monolithic by reason of a minutely uniform and intimate bond between the hard surfacing sheet material and the cellular insulating material, rather than an adhesion therebetween. By this I mean that under severe strain the two component parts, surface and body, shall not separate at the point of joining as in the case of adhesion, but rather one of the materials will itself rupture before the union of the two separates.

I have found that such a bond can only be attained when one of the materials is in liquid or solution form and hence can be brought into the minute uniform molecular contact with the other which is only possible under such condition; and that this intimate contact must be unremittingly maintained until the liquid component has been solidified and so form a real bond with the solid component, and thus a truly monolithic structure is produced in whatever form the structure may be desired.

Referring to the accompanying drawing.

Figure 1:
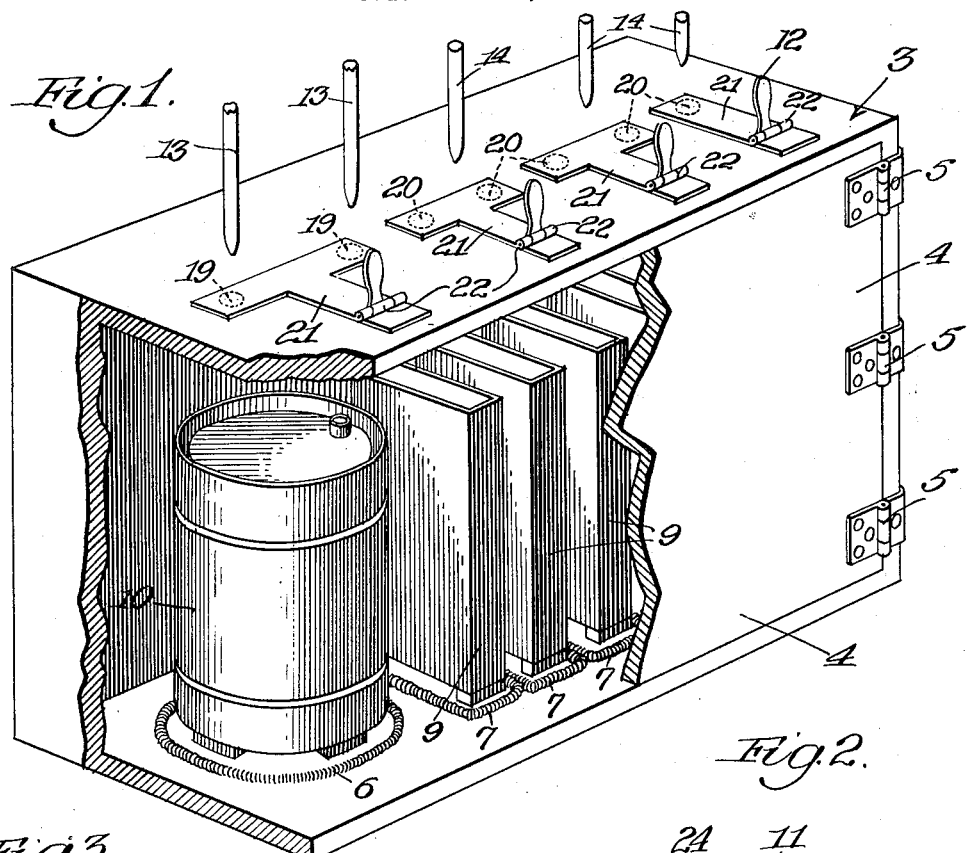
Figure 1 is a perspective view, in the nature of a diagram, of apparatus shown partly broken away, which may be used in practicing my novel method and producing certain of the kinds of monolithic structures within my invention.

While any suitable material which will answer all the above requirements may be used to produce the insulating material portion of the monolithic structure, I prefer to use material at least the greater portion of which is a metallic silicate, such as silicate of soda, as set forth in U. S. Letters Patent No. 1,842,875, granted to me January 26, 1932, starting as a solution in intimate contact with the face forming elements and, under the subjection of heat while in contact with the face-forming element, or elements, intumesced into the desired bonded relationship to such elements, producing a rigid and strong cellular body structure monolithic with the face-forming elements and capable of withstanding the relatively high temperatures above referred to.

The metallic silicate solution is heated preferably to a temperature of about 600° F. or 700° F., through the stages in which the material, under the action of the heat, forms into large bubbles which eventually break, and the following stage in which the bubbling subsides, and the subjection of the material to this heat continued until the mass, in resuming the bubbling, swells to the desired thickness, during all of which processes it is continuously in the said intimate contact with the face-forming elements.

The second stage bubbling above referred to produces relatively minute bubbles which remain substantially unbroken (as distinguished from a structure produced by subjecting the material to such heat that calcination and rupture of the cell walls results) whereby the resultant solid body is of cellular structure with the walls thereof relatively minute, narrow, and vertically elongated and with the inner surfaces thereof relatively smooth and resistant to the impact of heat energy in the use thereof as an insulant. Furthermore, the minute bubbles being formed by the expansion of gaseous fluid generated by the subjection of the material to heat, which, upon cooling, becomes rarefied and remains in the cells, enhances the insulating action.

As a specific example of a material to be used in producing the bonded insulating element of the monolithic product, it may comprise the following named ingredients in the proportions noted:

|  | Pounds |
|---|---|
| A saturated solution of silicate of soda | 1 |
| Dry silicate of soda | 1 1/16 |
| Borax | 1 1/16 |

The ingredients named are thoroughly mixed together and the resultant mixture then subjected to the heat as stated, and at all times in intimate contact with the face forming element, as noted.

The use of dry silicate of soda and borax increases the hardness and toughness of the product and causes the walls of the cells thereof to be thicker than in the case of a product made by heat-treating silicate of soda only. It will be understood, however, that the dry silicate of soda or the borax may be omitted, but not without sacrificing certain of the advantages of the products produced by combining the ingredients above mentioned, and furthermore, either one of the solids mentioned above may be omitted, or the relative proportions varied in either case, but always with the sodium silicate solution in very material preponderance. Furthermore, if desired, any suitable metallic silicate may be used alone, or with any other desirable ingredients. Such technique depends on the purpose or use or structural form in which the monolithic structure is to be made.

The product may be made of any desired form, as stated. Examples of two forms of such product are shown in the drawing, one of slab form, such as for example as may be used in the building of insulated wall or floor structures, and the other of container form, as for example an insulated metal beer barrel.

Fig. 1 of the drawing illustrates an apparatus suitable for producing the two specific products above referred to, and comprising a furnace housing represented at 3 one side of which is in the form of a door 4 hinged as represented at 5 to the body of the casing.

Heating means represented diagrammatically at 6 and 7 and shown, by way of example, as in the form of electric heating elements supplied with suitable current from any desirable source of supply (not shown) are located in the housing 3 at the bottom thereof, the heating elements 7 being preferably of rectangular grid form for use in producing the slab form of product, and the heating element 6 preferably of circular grid form for use in producing the container form of product, these elements being so disposed relative to the molds, hereinafter referred to, as to obtain the desired temperature in the housing 3 for properly intumescing the material from which the insulating material is to be formed, without calcining any portions thereof.

Figures 2, 3:
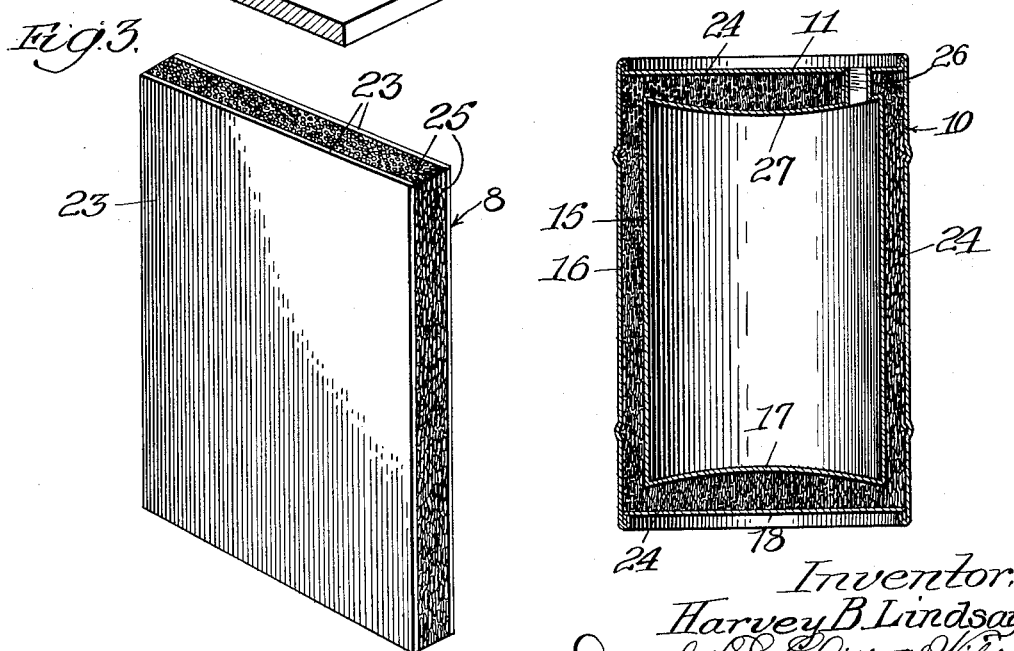
Figure 2 is a view in vertical sectional elevation of a container embodying my invention and produced in accordance with my novel method.
Figure 3, a perspective view of an insulating structural slab embodying my invention and produced in accordance with my novel method.

The production of the slab form of product indicated at 8 and shown in Fig. 3, involves the use of rectangular open top molds 9, as for example of metal, supported preferably to extend symmetrically with the heating elements 7 as shown in Fig. 1; and the production of the container form of product contemplates the positioning of the double wall container represented at 10, with its uppermost top wall 11 omitted, preferably symmetrically with the heating element 6 as shown in Fig. 1, the inner shell structure of the container being supported in spaced relation to the outer shell thereof, as for example by small pieces of material interposed between the bottom and side walls of these shells and which may be left in place in the intumesced insulating material.

The top wall 12 of the housing 3 contains openings in vertical alinement with the spaces into which the liquid material to be intumesced as above stated, is to be discharged from a series of movable nozzles 13 and 14 disposed above the housing 3 and leading from a suitable controllable supply (not shown) of the liquid material. In the particular apparatus shown the openings through which the nozzles 13 above them are lowered to discharge the liquid material into the space between the double concentric side walls 15 and 16 of the container 10 and the upper and lower spaced apart bottom walls 17 and 18 thereof, are represented at 19; and the openings through which the nozzles 14 are lowered to discharge the liquid material into the molds 9 are represented at 20. Covers 21 hinged to the top wall 12 at 22, serve as closures for the openings 19 and 20 during the periods when no material is being fed to the container 10 and molds 9.

Prior to the supplying of liquid material to the molds 9, the surfaces of the facing sheets which are to form the outer surfaces of the monolithic slab product 8 and represented at 23 and which may be of any desirable material, as for example metal and are inserted into the molds 9 to extend flatwise against the opposite large-area side walls of the mold coextensive therewith, and also the surfaces of the walls forming the space in the container 10 into which the liquid material is to be introduced, and constituting face-forming elements, are thoroughly cleansed of any grease, dirt, scale, or other extraneous material thereon to insure of the adequate bonding thereto, throughout their exposed surfaces, of the liquid material, during the process of intumescence, as above stated.

In the manufacture of the monolithic product the liquid material is supplied to the molds 9 and the spaces between the inner and outer shell walls of the container 10, by successive partial charges. Each partial charge is subjected to heat as stated, supplied by the heating means 6 and 7, to produce the minute vertically elongated cellular body structure hereinbefore referred to, each successive partial charge being supplied to the previously intumesced partial charge substantially at the conclusion of the intumescing operation resulting in the production of the minute elongated cells referred to, the cellular structure thus being built up by a progressive action. In thus treating the liquid materials the resulting intumesced material produced from the successive partial charges and represented at 24 in the case of the container 10 and at 25 in the case of the slab product 8, becomes completely bonded to itself and to the walls of the insulation space of the container and the inner surfaces of the sheets 23, throughout the areas of these walls and sheets, thus forming with the walls or sheets as the case may be, a monolithic structure possessing the characteristics above described.

The intumesced insulating material being resistant to locally applied heat such as that required for welding together metal sheets, the edges of the insulating material may, if desired, in the case of the slab construction, be enclosed by metal strips (not shown) welded to the sheets 23.

In the case of the container 10 the insulating material 24 is built up in the insulation space in the container substantially to the top edge of the side wall 15 and a threaded spigot tube 26 and the uppermost top wall 11 then applied to the position shown in Fig. 2, the tube 26 being preferably welded to the inner top wall 27 of the container and to the wall 11, the wall 11, if desired, being welded to the outer wall 16.

The top wall 11 has an opening (not shown) through which to introduce more of the liquid material to be intumesced, as described, for filling the space between the walls 11 and 27 and the bonding of the same therewith and to the intumesced material below it. Following the complete filling of the insulation space with the intumesced material the opening referred to for the final filling is closed, as for example by welding a plate over it.

It may be further said of the container form of product shown and described that as a finished product, it is of utmost importance that the inner container shell portion be held in the utmost rigid relation to the outer enclosing shell portion as any movement between these two shell portions would soon crack or damage the connecting spigot tube 26 resulting in leakage of the contents of the container into the insulating material, such impairing of the structure being prevented by the rigid bonding of the inner and outer shell structures of the container and the insulating material, as a monolithic structure, as described.

Furthermore, as will be noted, force exerted against either of the plates 23 or the outer shell of the container and producing dents therein will only cause corresponding dents to be produced in the insulating element of the monolith, without cracking or shattering of the latter, or causing separation.

While I have illustrated and described a particular way of practicing my improved method and have illustrated and described certain products embodying my invention, I do not wish to be understood as intending to limit it thereto as the method may be practiced in other ways, the product shown may be variously modified and altered and other forms of product produced, without departing from the spirit of my invention.

What I claim as new, and desire to secure by Letters Patent, is:

1. An insulating structure comprising a face-forming element and a body of intumesced metallic silicate extending over a face of said element and self-bonded thereto.

2. A heat-resistant and insulating structure comprising a sheet metal facing and an intumesced, cellular body comprising metallic silicate combined with a heat-resistant cell-wall-thickening and strengthening filler, said cellular body self-bonded to said facing to provide in effect a monolithic structure.

3. An insulating structure comprising spaced-apart face-forming elements and an interposed body of intumesced metallic silicate self-bonded to the opposed faces of said elements.

4. A fire-resistant structure comprising spaced-apart thin sheet metal elements and a body of interposed intumesced metallic silicate self-bonded to the opposed faces of said elements to provide, in effect, a monolithic structure.

5. The method of producing an insulating structure comprising a face-forming element and an insulating body extending over a face of said element and formed of a material of such character that it may be transformed from a liquid to a solid, which comprises positioning the material in liquid condition in contact with a clean face of said element, causing the transformation thereof from liquid to solid condition, and during such transformation maintaining it in contact with said element.

6. The method of producing insulating structures comprising a face-forming element and a body of insulating material extending over a face of said element, which comprises positioning a metallic silicate solution in contact with said face while in clean condition and heating the solution to intumesce it while maintaining contact between it and said element.

7. The method of producing a fire-resistant, heat-insulating structure which comprises: thoroughly removing all extraneous material from a face of a sheet metal element, placing a water solution of metallic silicate into contact with said clean face, applying heat to said element and said solution of sufficient intensity to cause intumescence of said silicate in contact with said clean face whereby to cause self-bonding of the resultant mass of intumesced silicate to said face of the element to provide a monolithic structure.

HARVEY B. LINDSAY.